Figure 1:
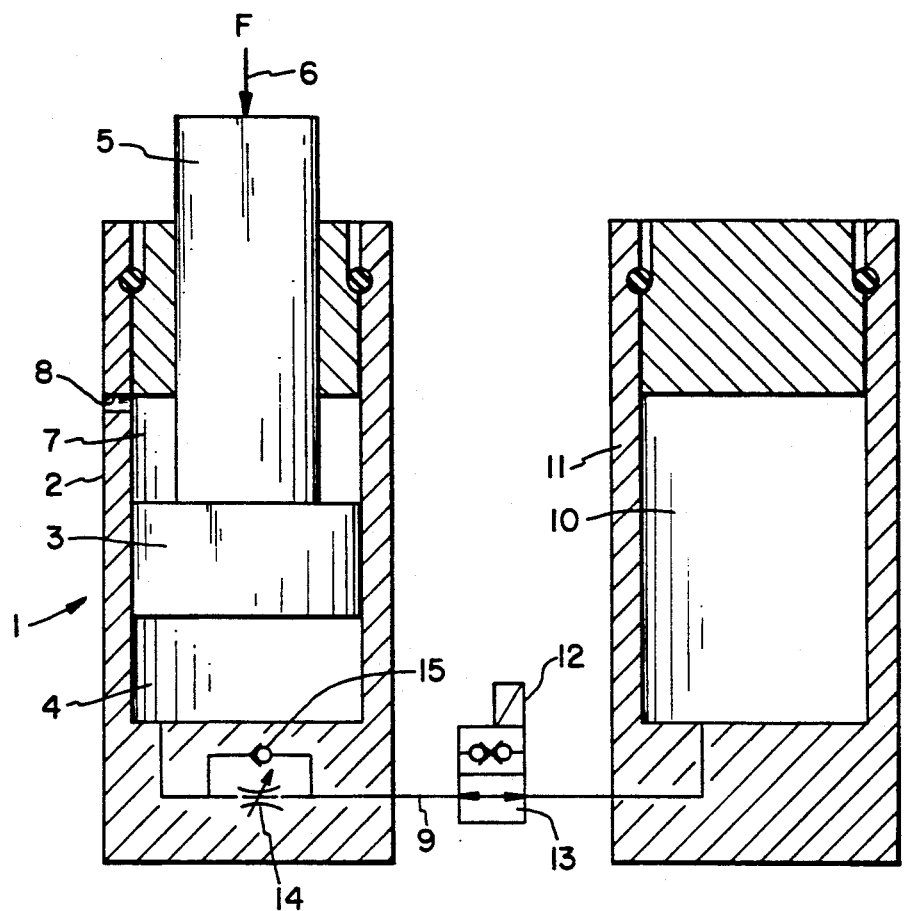

United States Patent [19]

Gustafsson

[11] Patent Number: 5,076,404
[45] Date of Patent: Dec. 31, 1991

[54] TIME DELAY DEVICE FOR A GAS SPRING

[75] Inventor: Krister Gustafsson, Tranas, Sweden

[73] Assignee: Stromsholmens Mekaniska Verkstad AB, Tranas, Sweden

[21] Appl. No.: 517,256

[22] Filed: May 1, 1990

[30] Foreign Application Priority Data

Jun. 2, 1989 [SE] Sweden ............................... 8902015

[51] Int. Cl.⁵ ................................................. F16F 5/00
[52] U.S. Cl. .................................. 188/314; 267/64.12; 267/114; 267/130
[58] Field of Search ........... 188/313, 315, 318, 322.14, 188/185; 267/64.16, 64.11, 64.26, 64.28, 64.18, 64.22, 31, 120, 118, 119, 114, 113, 75, 124, 126, 129, 64.12, 130

[56] References Cited

U.S. PATENT DOCUMENTS

| | | | |
|---|---|---|---|
| 4,061,295 | 7/1979 | Somm | 244/104 FP |
| 4,720,085 | 1/1988 | Shinbori et al. | 267/64.16 |
| 4,774,865 | 10/1988 | Wallis | 83/128 |

FOREIGN PATENT DOCUMENTS 1440758 7/1991 U.S.S.R. ........................... 267/64.12

*Primary Examiner*—Robert J. Oberleitner
*Assistant Examiner*—Chris Schwartz
*Attorney, Agent, or Firm*—Baker & Daniels

[57] ABSTRACT

The present invention relates to an arrangement for a gas spring (1). This comprises a cylinder (2) with a piston (3) capable of being displaced axially therein, which marks the boundary of an inner space (4) of the cylinder (2) filled with a compressible gas-oil mixture. The space (4) varies in volume in accordance with a force (F) acting upon a piston rod connected to the piston. The invention is characterized in that the inner space is so arranged as to communicate via an openable and closable valve (13) with a closed space (10). The arrangement includes a control device (12) for actuating the valve (13), which control device is so arranged as to close the valve (13) once the piston (3) has moved past a predetermined axial position in the cylinder (2), and as to open it at a predetermined time after the moment of closing.

3 Claims, 1 Drawing Sheet

U.S. Patent

Dec. 31, 1991

5,076,404

TIME DELAY DEVICE FOR A GAS SPRING

The present invention relates to an arrangement for a gas spring comprising a cylinder with a piston capable of being displaced axially therein, which marks the boundary of an inner space of the cylinder filled with a compressible gas-oil mixture which varies in volume in accordance with a force acting upon a piston rod operatively connected to the piston.

A conventional gas spring operates in the same way as a helical spring, i.e. it resumes its original length as soon as the load ceases to be applied. There is nevertheless a wish in many applications for the spring to resume its original length after a certain delay. An application of this kind is explained below.

Double-acting presses for the manufacture of deep-drawn components, in particular those with a flange, utilize a stamp which forces a plate blank against a sprung holding-up tool. The plate blank is held securely by means of a holding-down plate during the actual pressing operation. The sprung holding-up tool comprises gas springs with which hydraulically actuated ejector devices interact for the purpose of ejecting the finished component with a certain delay after the pressing operation is complete. These previously disclosed ejector devices, which interact with the sprung holding-up tool, are nevertheless time-consuming to adjust in connection with tool changes, since they call for a high degree of accuracy. It would be desirable for the gas springs themselves in the holding-up tool to be used as ejector devices.

The object of the present invention is to make available a gas spring of the kind referred to by way of introduction, which exhibits a delay in resuming its original length achieved in that the aforementioned internal space is so arranged as to communicate via an openable and closable valve with an otherwise closed space, and in that the arrangement includes a control device for actuating the valve, which control device is so arranged as to close the valve once the piston has moved past a predetermined axial position in the cylinder, and as to open it at a predetermined time after the moment of closing.

A controllable rate of return for the gas spring is achieved, as will be appreciated from a first special characteristic of the invention, by causing a switchable choke in the line between the internal space of the cylinder and the closed space to be so arranged as to function in connection with the opening of the valve.

A particularly compact and technically attractive design of an arrangement in accordance with the invention is obtained in accordance with another embodiment of a second special characteristic of the invention, in that the aforementioned space is defined by the outer wall of the aforementioned cylinder and the inner wall of a second cylinder, which second cylinder partially encloses the gas spring cylinder.

The invention is described in more detail below with reference to the accompanying drawing, in which FIG. 1 is a diagrammatic representation in the form of a longitudinal section through an arrangement in accordance with the invention.

Figure 2:
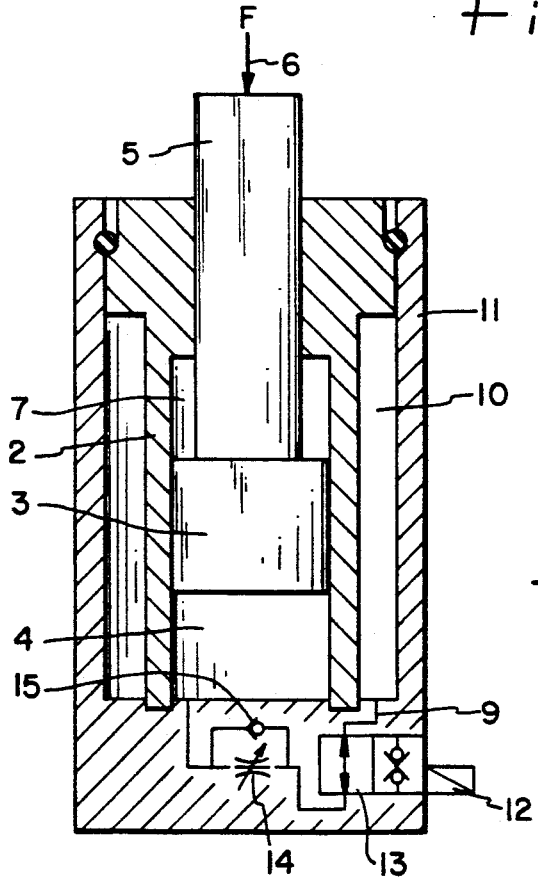

FIG. 2 shows a longitudinal section through an alternative embodiment of an arrangement in accordance with the invention.

The designation 1 is used generally in FIG. 1 in respect of a gas spring illustrated here in highly simplified form. Omitted from the illustration are, for example, those details which are self-evident to a person skilled in the art, such as seals and means of attachment of constituent component parts one to the other. The gas spring 1 comprises a cylinder 2 with a piston 3 capable of axial displacement therein. This marks the boundary of an inner space 4 of the cylinder 2. The volume of this space, which is filled with a compressible gas-oil mixture, varies in accordance with the level of a force F which acts upon a piston rod connected to the piston 3. The force F is symbolized in the Figure by an arrow 6. A space 7 situated on the other side of the piston 3 relative to the space 4 communicates with the atmosphere via a channel 8 in the wall of the cylinder 2, in order not to influence the characteristics of the gas spring.

In accordance with the invention the inner space 4 communicates via a line 9, indicated in FIG. 1 by a broken line, with a closed space 10, which is preferably bounded by a cylinder 11 sealed at both ends. Connected in the line 9 is a valve 13 which is capable of being opened and closed by means of a control device 12. The control device 12 is so arranged as to close the valve when the piston 3 has passed a predetermined axial position inside the cylinder 2, and as to open it at a predetermined time after the moment of closing. When in this axial position, the gas spring 1 is preferably compressed to its maximum extent.

Also connected in the line 9 is a choke 14, which comes into effect in connection with the opening of the valve 13, i.e. whilst the gas spring is resuming its original length. In accordance with a preferred embodiment of this choke, a non-return valve 15 is connected in parallel with the choke 14 in such a way that the effect of the latter is negligible when the gas-oil mixture is caused during the inward movement of the piston 3 to flow from the space 4 via the line 9 and the valves 13 and 15 connected in it. The non-return valve 15 closes in the opposite direction of flow of the gas-oil mixture, and the choke 14 has a decisive influence on the rate of flow of the gas-oil mixture and thus on the rate at which the spring 1 returns to its original length.

In FIG. 2, those components with an identical or similar function to their counterparts in FIG. 1 have been given the same designations as in FIG. 1. The cylinder 2 is enclosed in this case by the cylinder 11, so that the space 10 in accordance with this design is defined by the outer wall of the gas spring cylinder 2 and the inner wall of the cylinder 11. This design represents a compact construction, which is particularly well suited to the use in presses mentioned by way of introduction.

I claim:

1. A gas spring adapted for movement between compressed and extended positions, said spring comprising a cylinder and a piston capable of being displaced axially in said cylinder, said piston defining the boundary of an inner space of the cylinder, said inner space filled with a compressible fluid which varies in volume in accordance with a force acting upon a piston rod operatively connected to said piston, said inner space arranged so as to communicate via an openable and closable valve with a closed space, a control device for actuating said valve, said control device adapted to close said valve once said piston has moved past a predetermined axial position in said cylinder to thereby prevent fluid flow from said inner space to said closed space and lock said spring in its compressed position, and further adapted to open said valve at a predetermined time after closing of said valve to permit fluid flow between said inner space and closed space to thereby allow said spring to return to its extended position, said gas spring further including a choke arranged in series with said valve and a check valve arranged in parallel with said choke, whereby said choke has substantially no effect on the rate of fluid flow when fluid flows from said inner space to said closed space but affects the rate of fluid flow from said closed space to said inner space upon the expiration of said predetermined time.

2. The gas spring according to claim 1, wherein said closed space is defined by the outer wall of said cylinder and the inner wall of a second cylinder, said second cylinder partially enclosing said cylinder.

3. The gas spring according to claim 1, wherein said predetermined axial position corresponds to the maximum compressed length of the gas spring.

* * * * *